United States Patent [19]

Kumabe et al.

[11] 3,739,665
[45] June 19, 1973

[54] VIBRATING CUTTING METHOD AND APPARATUS

[75] Inventors: Junichiro Kumabe, Tokyo; Koichiro Kitamura, Tokaoka; Osamu Taniguchi, Tokyo, all of Japan

[73] Assignee: Rikagaku Kinkyusho, Saitama-ken, Japan

[22] Filed: Apr. 5, 1971

[21] Appl. No.: 131,357

[30] Foreign Application Priority Data
Apr. 8, 1970   Japan.............................. 45/29997

[52] U.S. Cl................ 82/DIG. 9, 29/96 R, 82/1 R, 82/36 R
[51] Int. Cl....... B23b 1/00, B23b 29/00, B26d 1/00
[58] Field of Search...................... 29/96; 81/1, 36, 81/DIG. 9

[56] References Cited
UNITED STATES PATENTS
3,559,259   2/1971   Kumabe.................................. 29/96
FOREIGN PATENTS OR APPLICATIONS
524,141   5/1931   Germany......................... 82/DIG. 9
714,860   9/1954   Great Britain.................. 82/DIG. 9

*Primary Examiner*—Harrison L. Hinson
*Attorney*—Bucknam and Archer

[57] ABSTRACT

This invention is to provide novel vibrating cutting method and apparatus in which vibrating tool holder in vibrating cutting machine tools is inclined at an angle to the direction of cutting so that the direction of a resultant force of cutting resistance force is at substantially right angle to the center axis of vibration of the bending vibration tool holder.

2 Claims, 4 Drawing Figures

VIBRATING CUTTING METHOD AND APPARATUS

This invention relates to novel vibrating cutting method and apparatus which can be used in vibrating cutting machine tools such as vibrating cutting planer, shapper, vibrating cutting lathes and vibrating cutting boring machines.

In general, vibrating cutting method is considered as one of proper methods to improve the cutting performance of cutting machine tools such as planers, shappers, lathes and boring machines. It is well known that vibrating cutting must be carried out in such a way that the cutting edge of a cutting tool may be vibrated in the direction of cutting under a condition satisfying the following inequality:

$$V < 2\pi a f$$

where $V$ = cutting velocity
$f$ = frequency
$a$ = amplitude

In case of concretely carrying out such a vibrating cutting method, the vibrating operation may be effected in different vibrating modes, for example bending vibration, torsional vibration, vertical vibration and composite vibration thereof. A cutting method by a conventional bending-vibrating tool holder making use of said vertical vibration system has been carried out as follows:

Referring now to FIG. 1, 1 is a bending-vibrating tool holder, 3 a vertically vibrating magneto vibrator, 4 and amplitude amplifying horn, 5 a tool and 6 a supporting post for the tool holder 1. The supporting post 6 passes through the tool holder 1, but is supported in contact with the tool holder 1 so that a relieving space is left between the supporting post 6 and the tool holder 1. 7 is a tool post, 8 an implement post, 9 a holding plate, 10 a clamp bolt, and 11 a work. The abovementioned conventional cutting method will be described hereunder. The bending-vibrating tool holder 1 is shaped to be vibrated in a one-dimensional bending vibrating mode as indicated by dotted line 2. The vertically vibrating magneto vibrator 3 and the horn 4 for amplifying the amplitude of oscillation are jointed to the tail end 1a of the tool holder 1 in an anti-node of oscillation. The other end of the tool holder 1 has a tool 5 in another antinode of oscillation. The tool holder 1 is secured to the implement post 8 of the tool post 7 by means of the supporting posts 6 provided in nodes of oscillation of the tool holder 1, the holding plate 9 and the clamp bolts 10. Vibrating cutting is effected by the bending-vibrating tool holder as mentioned above. If such conventional vibrating cutting method is applied to two-dimensional cutting of a work 11, a main component force Pc and a back component force Pt will be produced and thus a resultant force P of the component forces Pc and Pt will be exerted on the tool 5. The main component force Pc can be cancelled out by vibrating energy of the vertically vibrating magneto vibrator 3, but the back component force Pt serves to make the fitting of the supporting post 6 and the bending-vibrating tool holder 1 loose. Thus, a transverse vibration of the cutting edge of the tool 5 is caused in proportion to the looseness. Furthermore, a bending moment causes the center axis 12 of the vertically vibrating system to bend. Therefore, a longitudinal vibration of the tool holder 1 is superimposed on said transverse vibration and thus a circular motion of the cutting edge of the tool 5 is caused. As a result of this, an impact force is imposed on the flank surface of the cutting edge to more rapidly damage the cutting edge. As mentioned above, in such conventional method, no sufficient and satisfactory advantage of vibrating cutting has been obtained and the vibration has often adversely influenced the cutting operation.

The object of this invention is to provide novel vibrating cutting method and apparatus free from these defects and capable of making the life of a tool used longer and performing very smooth and stable vibrating cutting machining.

The essence of this invention to achieve the object lies in that a vertically vibrating magneto vibrator and a tool are located in anti-nodes of oscillation of a bending vibrating tool holder having supporting posts arranged in nodes of vibration and said vibrating tool holder is inclined at an angle to the direction of cutting so that the direction of a resultant force of cutting resistance forces is at substantially right angle to the center axis of vibration of the bending vibrating tool holder.

This invention will be described in connection with the accompanying drawings.

Figure 1:
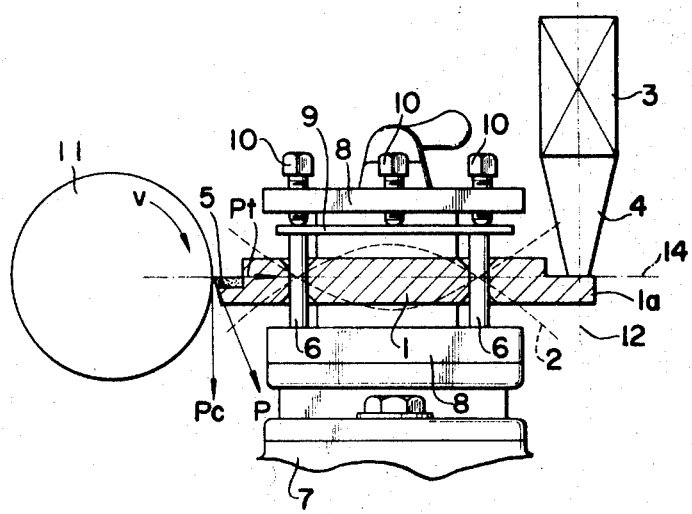
FIG. 1 is a partially sectional side view of the tool post of a vibrating cutting lathe according to a conventional vibrating cutting method.
Figure 2:
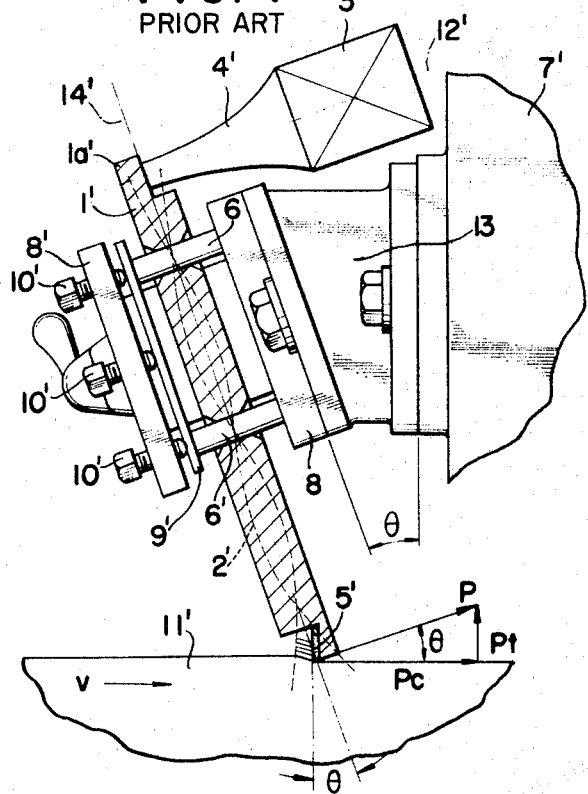
FIG. 2 is a partially sectional side view of the tool post of a vibrating cutting planar and shapper according to this invention.

FIG. 2 shows the tool post of a vibrating cutting planer and shapper. The parts of FIG. 2 corresponding to those of FIG. 1 are indicated by the same reference numerals. Reference numeral 13 indicates an inclined post.

Operation of the cutter of FIG. 2 will be explained. The inclined post 13 is located on a tool post 7. An implement post 8 is mounted on the inclined post 13. Thus, a bending vibrating tool holder 1 is inclined to perform vibrating cutting. In this case, a proper inclination angle $\theta$ of the inclined post 13 may be calculated from the following equation:

$$\theta = \tan^{-1} Pt/Pc$$

In other words, the bending vibrating tool holder 1 is so inclined for vibrating cutting that the direction of a resultant force P of cutting resistance forces is at substantially right angle to the center axis 14 of vibration of the bending vibrating tool holder 1. In the abovementioned vibrating cutting, the direction of a resultant force P of cutting resistance forces is in accord with the direction of vibration of the tool 5. Therefore, the tool can be vibrated in a same direction at any time during cutting, even if a vibration driving force opposing the resultant force P is given. For this reason, the life of a tool used can be made longer, and more stable vibrating cutting machining can be carried out without producing any chattering effect in cut surface.

The advantages of this invention will be described about some examples.

EXAMPLE (Vibrating Cutting Machining Carried Out by Plainer and Shapper of FIG. 2)

Plain cutting machining of cast iron has been successfully carried out under the following cutting conditions:

| | |
|---|---|
| The inclination angle of the inclined post 13 $\theta$ | 10° |
| Vibration frequency | 21.1 KHz |
| Amplitude | 15$\mu$ |
| Cutting speed | 30 m/min |
| Cut | 1 mm |
| Feed | 0.15 mm |

The theoretical finish roughness of the resultant cut surface has been very smooth and no chattering effect has been produced therein.

In this example, it has been found that the chattering effect is gradually reduced as the inclination angle $\theta$ is increased from 0°. When $\theta = 8°$, only a slight chattering effect has been produced. When $\theta = 10°$, calculating from a back component force $Pt$ and a main component force $Pc$ in the above-mentioned cutting condition, no chattering effect has been produced. It has been also found that the chattering effect begins to be produced again around the value of $\theta$ of 15° to 20°.

The degree of damage of the tool also changes with $\theta$. This change has been in accord with change in degree of the chattering effect produced as mentioned above. When $\theta = 10°$, that is, the direction of a resultant force of cutting resistance forces is at right angle to the center axis of the bending vibrating tool holder, the degree of damage of the tool has been minimized. In this case, it has been found that the life of a tool used is made 2 to 3 times longer as compared with by a conventional non-vibrating cutting.

Figure 3:
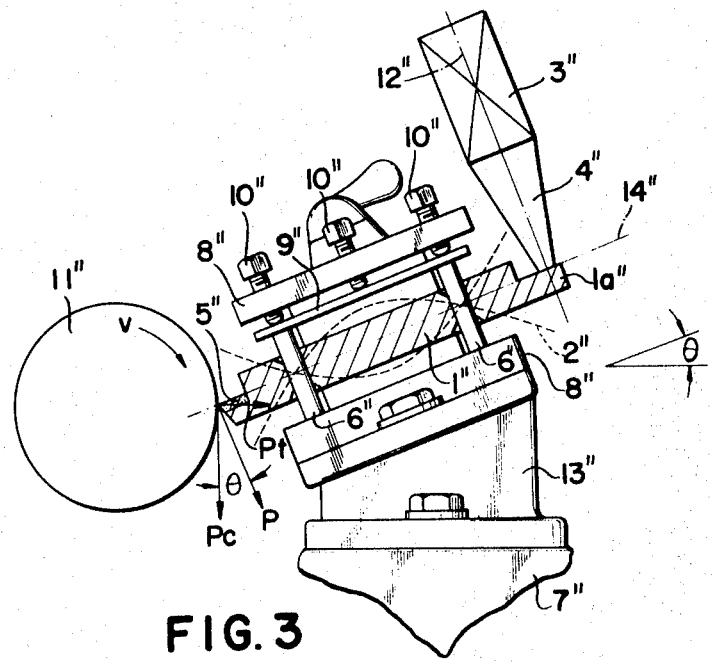
FIG. 3 is a partially sectional side view of the tool post of a vibrating cutting lathe according to this invention.

FIG. 3 shows a vibrating cutting lathe adopting a method according to this invention. The structure and advantages of the lathe of FIG. 3 are analoguous to those of the cutter of FIG. 2. An example of cutting by the lathe of FIG. 3 will be described hereunder.

EXAMPLE (Machining Carried Out by the Lathe of FIG. 3)

Latheing of SUS 27 stainless steel has been successfully carried out under the following cutting conditions:

| | |
|---|---|
| Inclination angle $\theta$ | 15° |
| Feed | 0.10 mm/rev. |
| Cut | 1.5 mm |
| Cutting speed | 30 m/min |
| Vibration frequency | 22.1 KHz |
| Amplitude | 15 $\mu$ |
| Oscillating power | 500 W |

The resultant cut surface has been very smooth and no chattering effect has been produced therein. The life of a tool used has been made 1.5 to 3 times longer as compared with the case of not carrying out a method of this inventions, that is, $\theta = 0°, 5°, 10°, 20°$ and $30°$.

Figure 4:
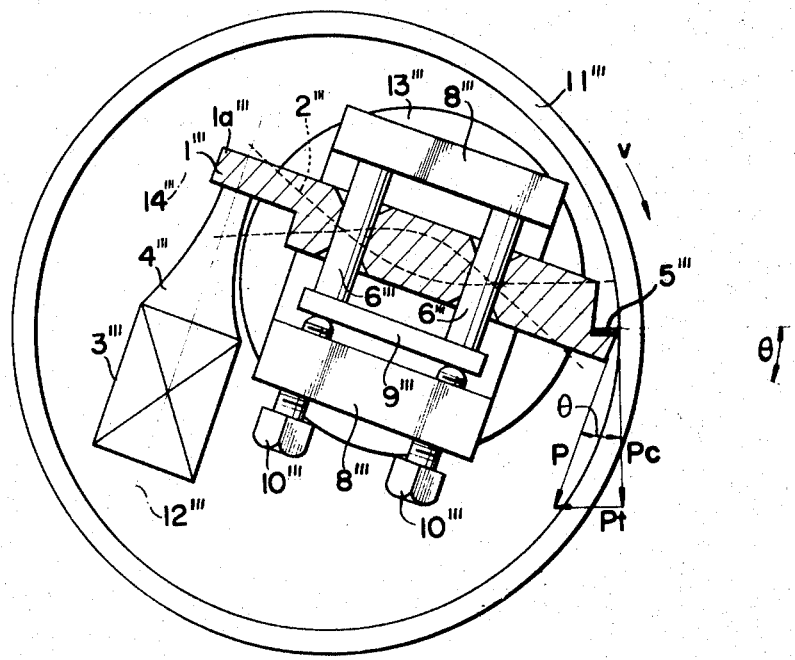
FIG. 4 is a partially sectional side view of the tool post of a vibrating cutting boring machine according to this invention.

FIG. 4 shows a vibrating cutting boring machine adopting a method of this invention. The structure and advantages of the machine of FIG. 4 are similar to those of the cutter and lathe of FIGS. 2 and 3.

We claim:

1. A vibrating tool cutting apparatus comprising an elongated tool holder, a cutting tool held by said tool holder at one end thereof, vibrator means connected to the other end of the tool holder to excite same into a mode of bending vibration transverse to the longitudinal axis of said tool holder, support means connected to the tool holder to position same in juxtaposition to the surface of a relatively moving workpiece for cutting said workpiece by contact with the cutting tool vibrating with the tool holder, said support means contacting the tool holder at locations thereon corresponding to nodes of said mode of vibration, said cutting tool and vibrator means being connected to the tool holder at locations thereon corresponding to anti-nodes of said mode of vibration, said support means being disposed to hold the tool holder with its longitudinal axis inclined at an angle to the direction of cutting establishing a resultant cutting reaction force applied by the workpiece to the cutting tool directed substantially perpendicular to the longitudinal axis of the tool holder.

2. A vibrating tool cutting apparatus according to claim 1 wherein the inclination of the tool holder axis is at an angle within the range of 8° to 15°.

* * * * *